Nov. 30, 1965 T. J. MESH ETAL 3,220,606
REMOTE COUNTER AND CONTROL THEREFOR PARTICULARLY
ADAPTED FOR LIQUID DISPENSING UNITS
Filed July 31, 1962 8 Sheets-Sheet 1

INVENTORS
THEODORE J. MESH
GEORGE D. ROBINSON JR.
BY Chapin & Neal
attorneys

Nov. 30, 1965 T. J. MESH ETAL 3,220,606
REMOTE COUNTER AND CONTROL THEREFOR PARTICULARLY
ADAPTED FOR LIQUID DISPENSING UNITS
Filed July 31, 1962 8 Sheets-Sheet 2

INVENTORS
THEODORE J. MESH
GEORGE D. ROBINSON JR.
BY Chapin & Neal
Attorneys

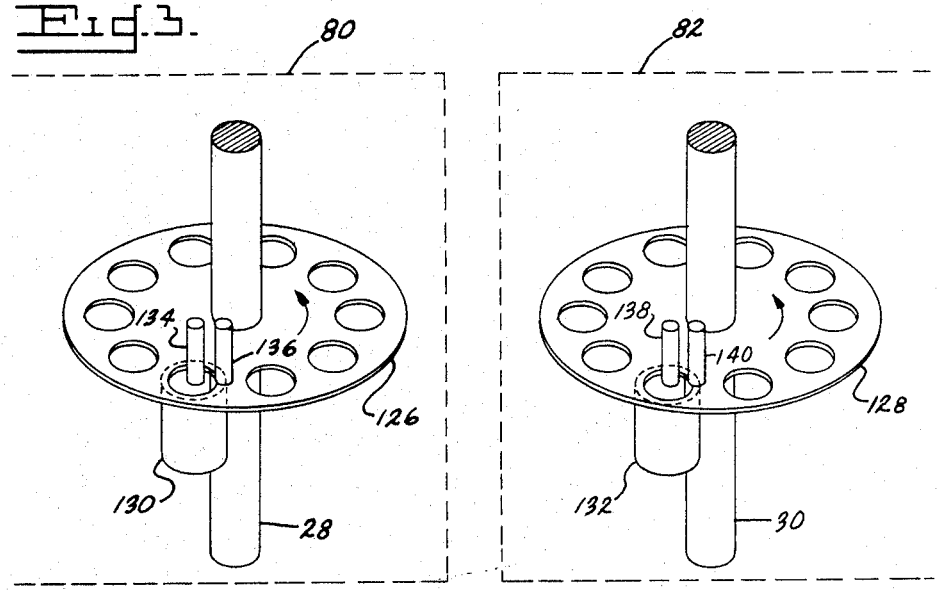
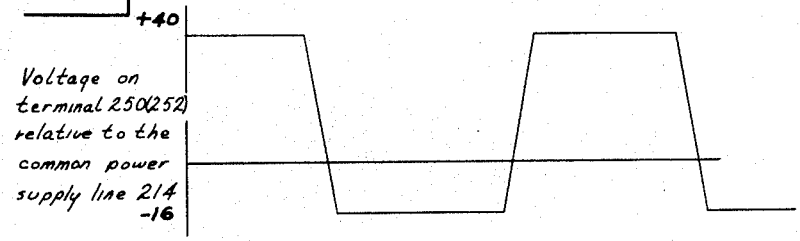
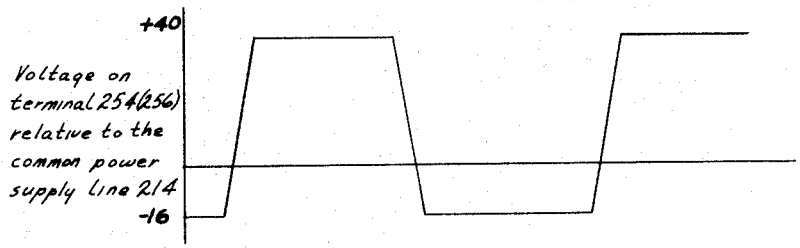

INVENTORS
THEODORE J. MESH
GEORGE D. ROBINSON JR.
BY Chapin & Neal
Attorneys

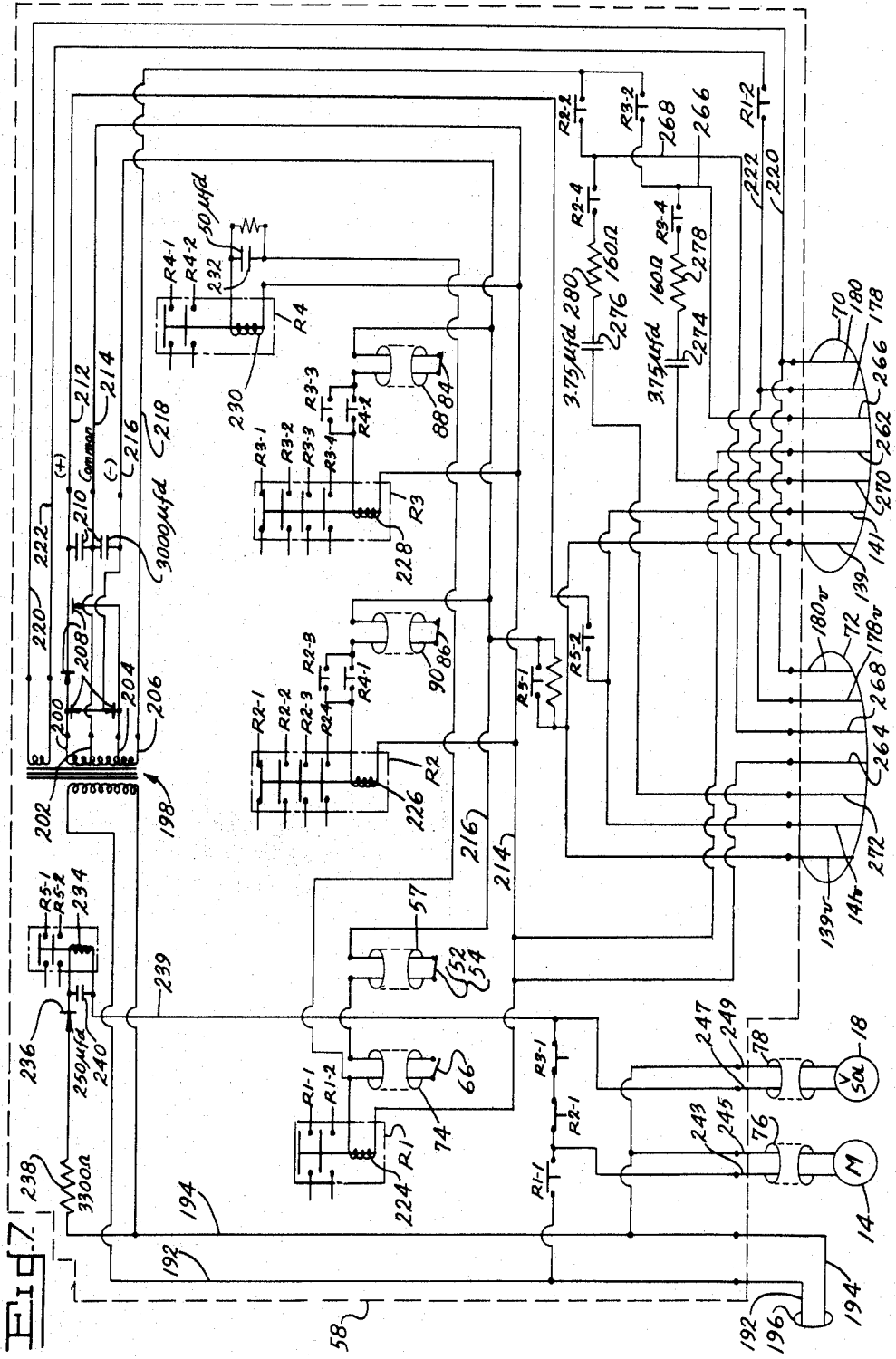

Nov. 30, 1965  T. J. MESH ETAL  3,220,606
REMOTE COUNTER AND CONTROL THEREFOR PARTICULARLY
ADAPTED FOR LIQUID DISPENSING UNITS
Filed July 31, 1962  8 Sheets-Sheet 6
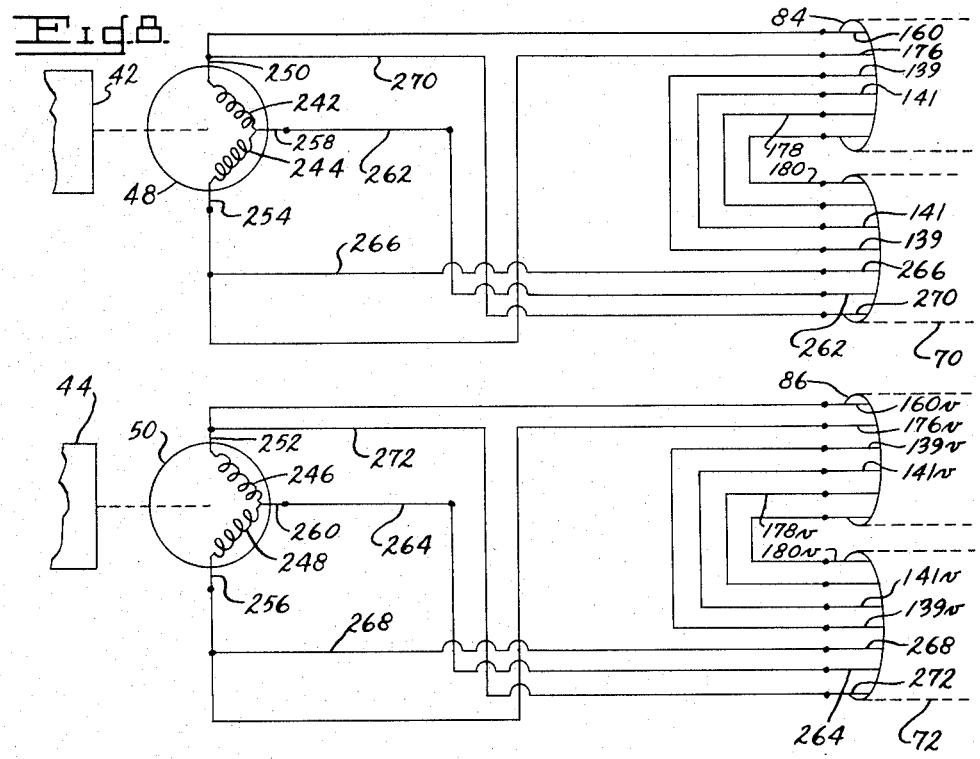
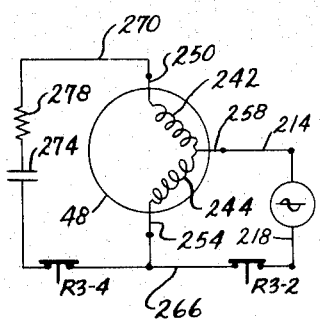
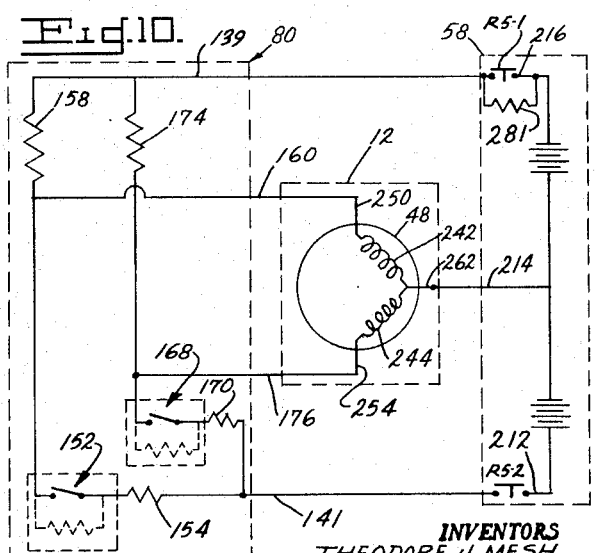
INVENTORS
THEODORE J. MESH
GEORGE D. ROBINSON JR.
BY Chapin & Neal
Attorneys

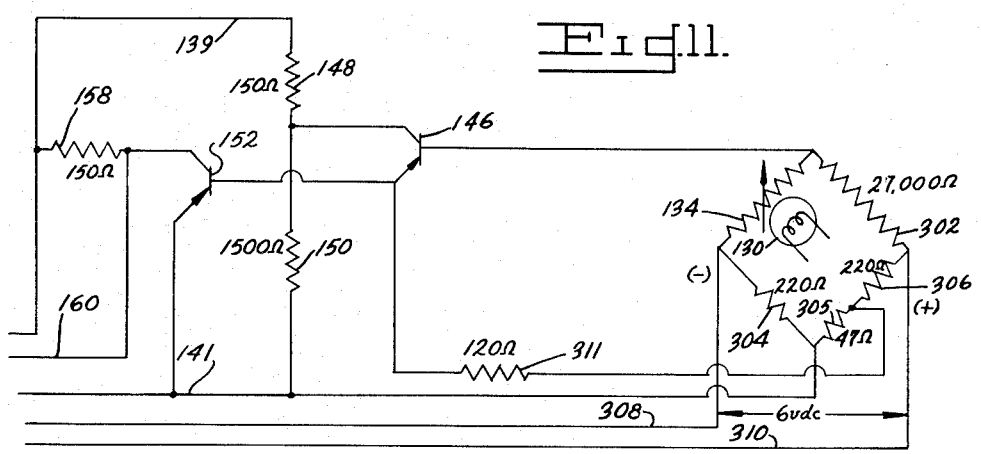
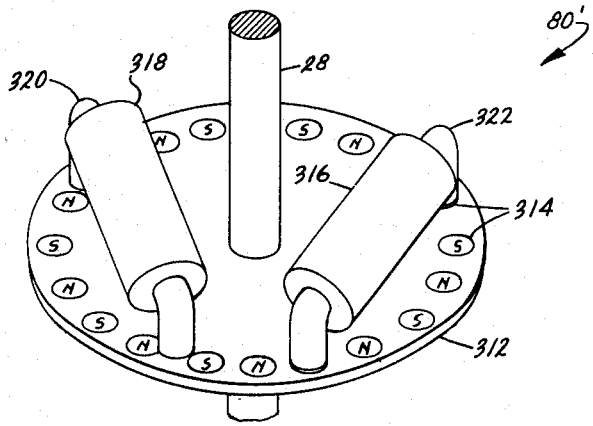
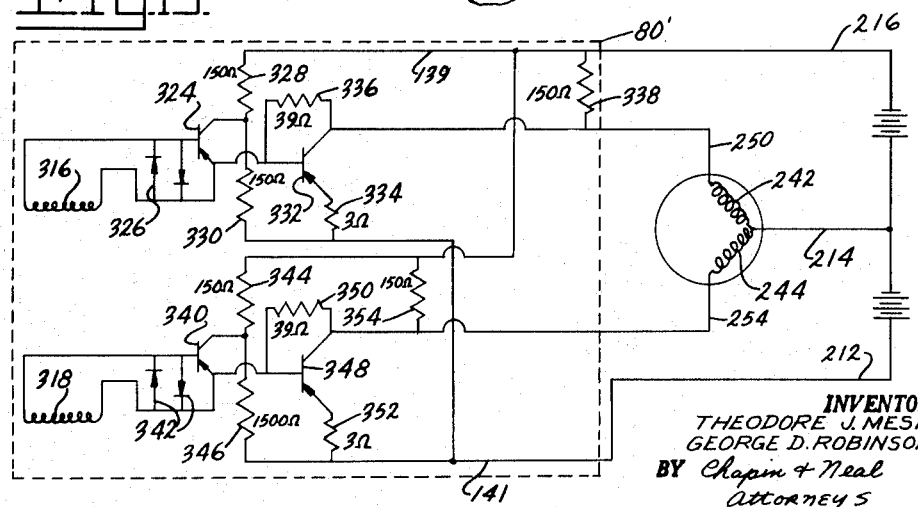

Nov. 30, 1965　　　T. J. MESH ETAL　　　3,220,606
REMOTE COUNTER AND CONTROL THEREFOR PARTICULARLY
ADAPTED FOR LIQUID DISPENSING UNITS
Filed July 31, 1962　　　　　　　　　　　8 Sheets-Sheet 8
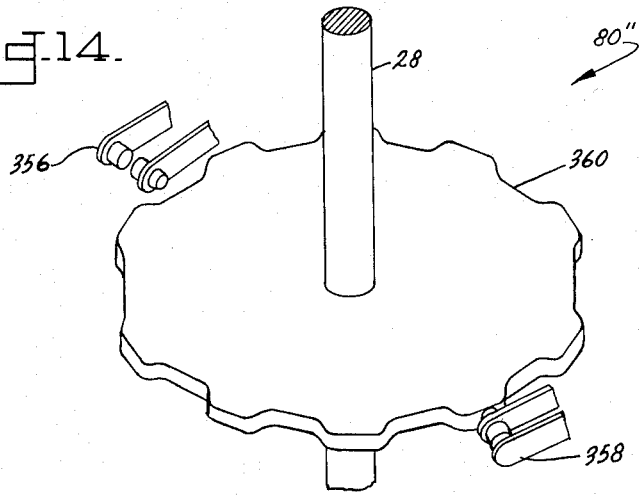
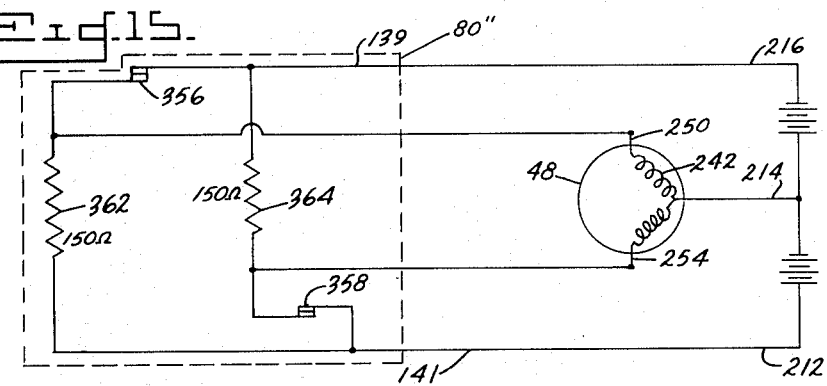
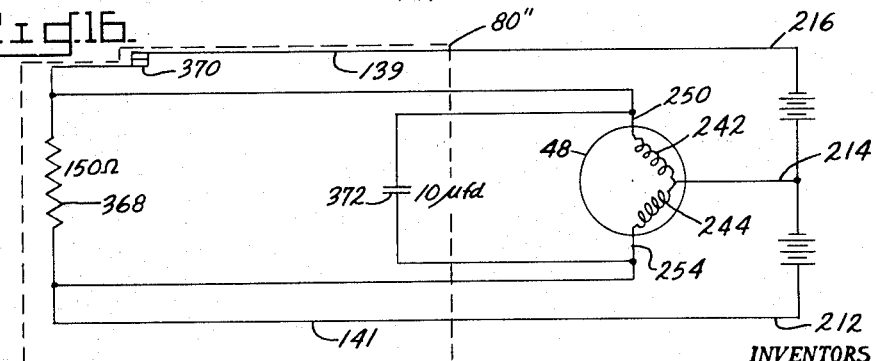
INVENTORS
THEODORE J. MESH
GEORGE D. ROBINSON JR.
BY Chapin + Neal
Attorneys

United States Patent Office 3,220,606
Patented Nov. 30, 1965

3,220,606
REMOTE COUNTER AND CONTROL THEREFOR PARTICULARLY ADAPTED FOR LIQUID DISPENSING UNITS
Theodore J. Mesh, Easthampton, and George D. Robinson, Jr., Agawam, Mass., assignors to Gilbert & Barker Manufacturing Company, West Springfield, Mass., a corporation of Massachusetts
Filed July 31, 1962, Ser. No. 213,654
13 Claims. (Cl. 222—35)

The present invention relates to improvements in remote indicating or telemetering apparatus for liquid dispensing systems and in certain aspects relates more generally to improvements in control means for stepping motors adapted for use in such systems.

The present invention was motivated by the needs of the petroleum industry in the retail sale of gasoline and reference thereto will be made for the sake of clarity without, however, necessarily implying any limitation on the utility of the various features herein disclosed.

The usual gasoline dispensing unit has register wheels on its opposite sides which indicate the cost, volume and unit price of each delivery. Oftentimes the driver of a car, or particularly a truck, cannot see these register wheels unless he gets out of his seat and walks up to the dispensing unit. This is particularly inconvenient during inclement weather.

One object of the invention is to provide a simplified and improved liquid dispensing unit and remote register combination wherein the remote register may be disposed so that the cost and volume of each delivery of gasoline or the like will be visible to the driver of a vehicle, regardless of where he stops within the limits of the usual delivery hose.

Another object of the invention is to provide improved means for zeroing the remote register and preventing delivery of gasoline before the remote register has been zeroed.

Yet another object of the invention is to provide improved remote register means which employ register wheels rotated incrementally by simplified and economical means employing stepping motors, and further wherein such means are capable of operating at widely varying rates.

Still another object of the invention is to provide improved means for conforming the rotation of such a stepping motor to the drive output of the gasoline meter of the dispensing unit without imposing any load on the meter itself.

A further object of the invention is to provide improved control means for stepping motors which are particularly adapted for use in remote register means and servo-motor applications in general.

In a general sense, the invention is characterized by a combination which includes the usual dispensing apparatus and a register mounted at a remote location. Preferably, there is both a set of volume wheels and a set of cost wheels provided at the remote register. Means are provided to rotate the remote register wheels so that they will indicate the cost and volume of each delivery and conform to the reading of the register wheels usually found at the dispensing unit. The driving means for each set of remote register wheels advantageously comprises a stepping motor which is rotated in direct proportion to the rotation of the appropriate "money" or "gallons" shaft of the price computing variator, normally found in the dispensing unit, for driving the register wheels thereof.

Stepping motors are known in the art and rotate incrementally in response to alternate changes in polarity of two 90° phased field windings. In accordance with the present invention, one end of one of the field windings is connected to the common terminal of a D.-C. power supply. A resistance load is connected across the power supply, and the other end of the field winding is connected to the resistance load to bias this other end with the polarity of one biased terminal of the power supply. Means operative in response to rotation of the money or gallons shaft of the variator are provided for varying the the current flow between the said one biased terminal and the connection of the other end of the field winding to the resistance load sufficiently to reverse the polarity across this one field winding. Also means are provided for reversing the polarity across the other field winding out of phase with the reversal of polarity across the one field winding thereby resulting in rotation of the stepping motor conforming with the money or gallon shaft of the variator, there preferably being one stepping motor for rotating the price indicating wheels of the remote register and a second stepping motor for rotating the gallons indicating wheels of the remote register.

The above and other related objects and features of the invention will be apparent from a reading of the description of the disclosure found in the accompanying drawings and the novelty thereof pointed out in the appended claims.

In the drawings:

FIG. 3 is a diagrammatic view of the mechanical portion of switch-like means employed in the operation of the remote register;

FIG. 4 is a representative showing of voltage wave forms developed in the operation of the present device;

FIG. 7 is a diagrammatic showing of other electrical controls;

FIG. 8 is a simplified electrical diagram of stepping motors employed herein;

FIG. 9 is a simplified showing of the connections to one of the stepping motors for "reverse" rotation thereof;

FIG. 10 is a simplified showing of the connections to one of the stepping motors for "forward" rotation thereof;

FIG. 11 is a diagrammatic showing of a modification of the switch-like means for high speed operation;

FIG. 12 diagrammatically depicts the mechanical portions of an alternate switch-like means;

FIG. 13 is a diagrammatic showing of the electrical portions of alternate switch-like means employed in combination with the elements of FIG. 12;

FIG. 14 is a diagrammatic view of the mechanical portions of another alternate switch-like means;

FIG. 15 is a diagrammatic showing of the electrical portions of the switch-like means employed in combination with the elements of FIG. 14;

FIG. 16 is a diagrammatic showing of yet another switch-like means which may be employed.

Figure 1:
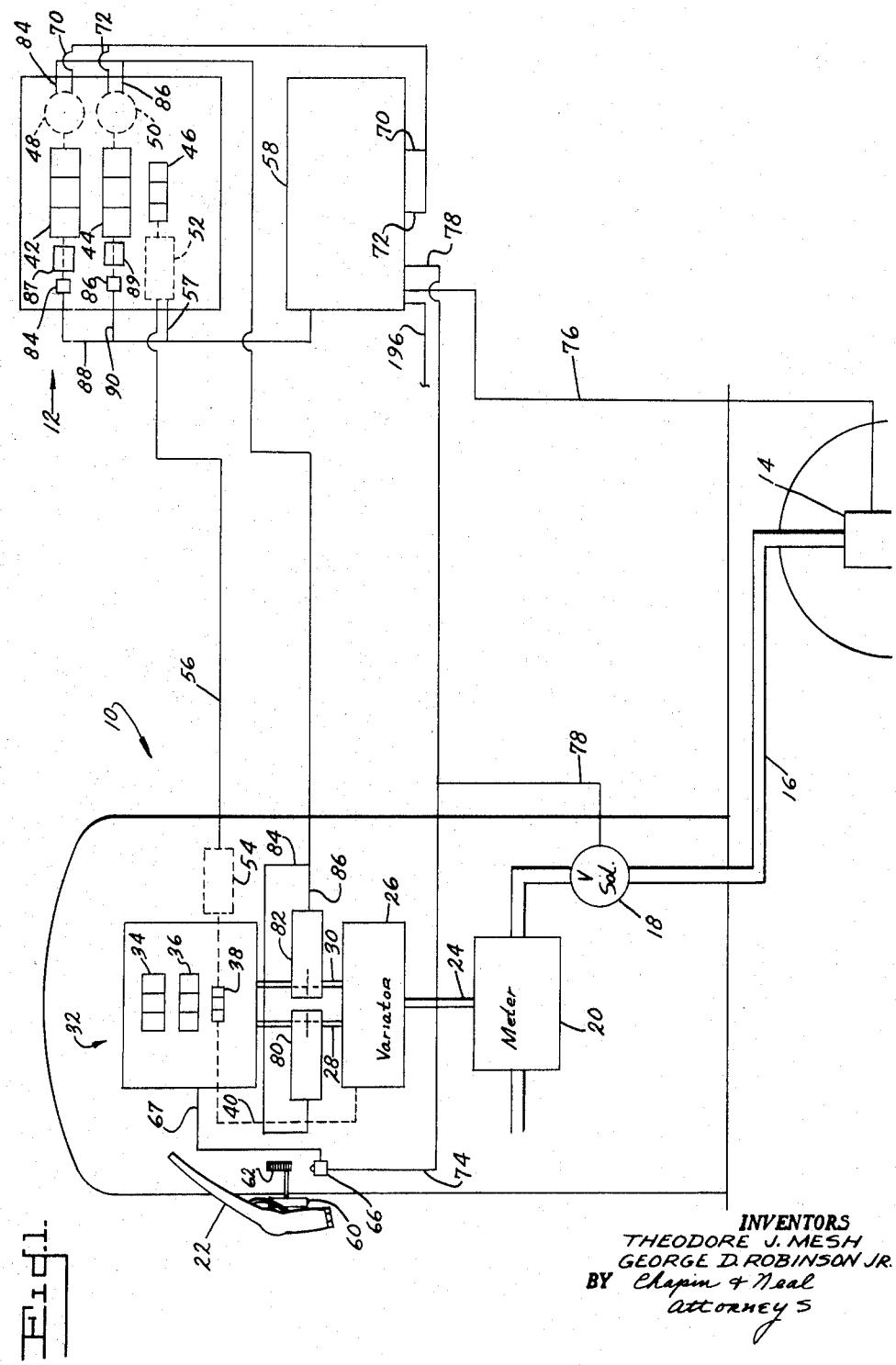
FIG. 1 is a diagrammatic view of a dispensing apparatus and remote register means embodying the present invention.

Referring first to FIG. 1, a gasoline dispensing unit is indicated generally at 10. This dispensing unit would ordinarily be mounted at the service island of a filling station, along with other dispensers for the same or different grades of gasoline. Remote from the dispensing unit 10 are one or more remote indicators 12 which, for example, could be mounted at opposite ends of the service island and identified in an appropriate manner to indicate that the reading on such registers corresponded to the amount and cost of liquid delivered by the particular dispensing unit 10.

The dispensing unit 10 comprises the usual components employed in the retail delivery of gasoline. The gasoline is discharged from a remote storage tank by a motor-driven pump 14 submerged therein. The pressurized gasoline passes through conduit 16 to a solenoid valve 18 which is opened to permit delivery of gasoline. From valve 18 the gasoline passes through a standard meter 20 which is preferably of the positive displacement, piston type. The gasoline then passes to a nozzle 22 which is at the end of the usual flexible delivery hose. With the motor 14 actuated and the valve 18 open, gasoline is pressurized to the nozzle 22 for delivery therefrom.

Actual delivery of the gasoline is controlled by the valve of the nozzle 22 and the amount delivered is reflected by the extent of rotation of the output shaft 24 of the meter 20. The shaft 24 drives a price computing variator 26 of the usual type which is adjusted so that one output shaft 28 will rotate at a rate reflecting the established unit price of the gasoline. The variator has a second output shaft 30 which rotates in fixed relation to the rate of rotation of meter shaft 24 and, in effect, is directly driven therefrom to reflect the volume of gasoline delivered. A register 32 has price indicating wheels 34 which are driven by the shaft 28 and volume indicating wheels 36 which are driven by the shaft 30. Register wheels 38 indicate the unit price of the gasoline and are mechanically interlocked by known means 40 to the variator 26 so that they will indicate the price setting of the variator. It is usual for the register 32 to have duplicate wheels 34, 36 and 38 and on its opposite side to indicate the cost and amount of each delivery from either side of the service island.

The remote register 12 comprises a set of numeral wheels 42 for indicating the cost of each delivery, numeral wheels 44 for indicating the amount of each delivery, and numeral wheels 46 for indicating the unit cost of the gasoline. The wheels 42 are driven by a stepping motor 48, while the wheels 44 are driven by a stepping motor 50. The wheels 46 are manually set to correspond to the reading of wheels 38. A set of switches 52 are mechanically connected to the wheels 46 and electrically connected, by cable 56, to a second set of switches 54 at the dispensing unit 10. The switches 54 are mechanically connected to the wheels 38 and arranged so that when the setting of the wheels 38, 46 is the same, a circuit will be completed through both sets of switches 52, 54. Completion of this circuit is indicated through cable 57 extending to a control box 58 and is necessary before gasoline can be delivered.

The control box 58 houses the greater part of the electrical controls, later described, which are required for controlling operation of the various elements of the general combination set forth above.

The normal sequence of operation begins with the operator removing nozzle 22 from a knob 60, permitting the latter to be rotated. The knob 60 is rotated to an "on" position in which a start switch 66 is closed. The switch 66 is connected to a register 32 through line 67 and actuates known means for resetting the wheels 34, 36 to zero before a subsequent delivery can be made. Switch 66 is also connected to the control box 58, through line 74. Actuation of switch 66 also energizes motors 48, 50 (connected to control box 58 by cables 70, 72) for rotation in a reverse direction which zeroes the remote register wheels 42, 44. After zeroing the motor 14 will automatically be energized by current flowing through line 76 and solenoid valve 18 automatically energized and opened by current flowing through line 78.

At this point the operator is free to deliver gasoline simply by opening the valve in the nozzle 22. Then as gasoline is dispensed, the cost and amount will be shown at both the dispenser 10 and the remote register 12. After a delivery is completed the knob 60 must be rotated back to its original position before the nozzle 22 may be hung in its accustomed place. Once this is done, the register 32 and the remote register 12 will automatically be zeroed when the knob 60 is rotated to again close switch 66 before a subsequent delivery can be made.

Rotation of the remote register wheels 42, 44 is controlled by the stepping motors 48, 50 which are for practical purposes, servomotors or slaves to the rotation of drive output of the meter 20, viz. the output shafts 28, 30 of variator 26.

A D.-C. power supply (later described) is provided in the control box 58 with common, negatively biased and positively biased lines extending therefrom to the stepping motors 48, 50 and to switch-like means 80, 82 at the dispensing unit. The lines between the motors 48, 50 and switch-like means 80, 82 are carried in cables 84, 86 respectively. The switch-like means cause variations in current flow through the biased lines and a resulting reversal of polarity on field coil windings of the motors 48 and 50, as is later described in detail. Each polarity reversal at the motors 48, 50 causes an incremental rotation thereof which duplicates in step-like fashion the rotation of the variator shafts 28 and 30. The wheels 42 and 44 can therefore be driven at the same rate as the wheels 34, 36 respectively.

The mechanical drive for the wheels 42, 46 may be essentially the same as that shown in FIGS. 3, 8 and 9 of U.S. patent application Serial No. 807,509, filed April 20, 1959 now Patent No. 3,027,048. That is, the right hand wheels 42, 46 indicate the lowest increment measurement (e.g., 1/10¢ and 1/10 gal.) and are driven directly from the shafts on which they are mounted, and these shafts are, in turn, driven from the motors 48 and 50. The next adjacent wheels rotate a given increment (1/10 rev.) upon completion of a full revolution of the wheel to the right thereof through appropriate Geneva mechanism. This is the normal operation during delivery of gasoline when the motors 48, 50 are rotating in "forward" directions.

During reset, the motors 48, 50 are rotated in "reverse" directions causing the wheels to rotate in the opposite direction and engage abutments which align the zero numerals of adjacent wheels until all zero numerals are exposed on the face of the register, which would be the zero position for each set of wheels. "Reverse" rotation of each motor 48, 50 continues a short way after this zero position is reached in order to effect closure of switches 84, 86. The switches 84, 86 are connected to the control box 58 through lines 88, 90 and control mechanism for preventing delivery of gasoline prior to zeroing of the wheels 42, 44 as reflected by actuation of said switches. Spring mechanism then returns the wheels 42, 44 from these "minus" positions to their exact zero positions before delivery of gasoline is begun. The means for zeroing the wheels 42, 44 as described above is diagrammatically indicated at 87, 89 respectively and are fully disclosed in said application Serial No. 807,509. Further, an electrical detent action, later described, is provided by motors 48, 50, to lock the wheels 42 and 44 in their zero positions preventing a false start position due to rebound of the wheels.

Figure 2:
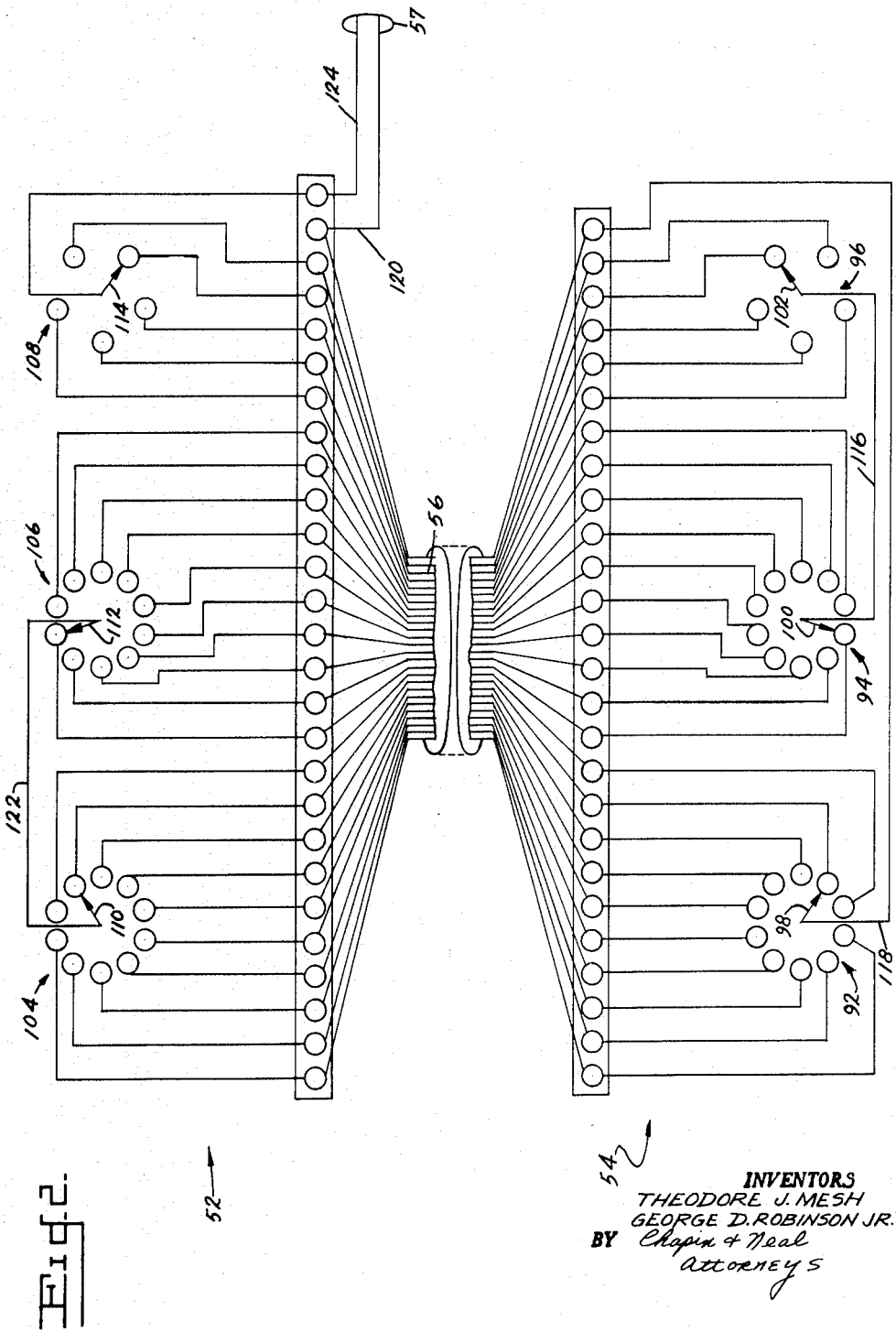
FIG. 2 is an electrical diagram of switches which are employed in assuring correspondency of unit price wheels at the dispenser and remote register.

Referring now to FIG. 2, the switches 52, 54 for insuring correspondency between the unit price indicating wheels 38 and 46 will be described. The switch unit 54 comprises three sets of circularly disposed contacts 92, 94, 96 which are selectively engaged by contact arms 98, 100 and 102, respectively. The switch unit 52 comprises three sets of circularly disposed contacts 104, 106 and 108 which are selectively engaged by contact arms 110, 112 and 114, respectively. Each of the contacts 92 is electrically connected to one of the contacts 104, while each of the contacts 94 is electrically connected to one of the contacts 106 and each of the contacts 96 is electrically connected to one of the contacts 114. All of these connections are made through separate wires in cable 56. Contact arms 100 and 102 are electrically connected by wire 116. Contact arm 98 is electrically connected to wire 118 which is joined, through cable 56 with one wire 120 of cable 57 at the remote switch unit 52. Contact arms 110, 112 are joined by wire 122 while contact arm 114 is connected to the other wire 124 of cable 57.

The contacts 92, 104 represent tenths of a cent; the contacts 94, 112 represent cents; and the contacts 96, 114 represent tens of cents. The contact arms 98, 100, 102 are mechanically connected to the tenths, cents and tens wheels 38 respectively so that the particular contacts 92, 94 and 96 engaged respectively thereby represent the unit cost of the gasoline as established by adjustment of the variator 26. The contact arms 110, 112 and 114 are mechanically connected to tenths, cents and tens wheels 46 respectively. When the wheels 46 are rotated to display the same unit price figures as the wheels 38, a circuit will be completed as follows. Starting at wire 120 current may flow through wire 118 to contact arm 98, then to the proper contact 104 and arm 110, wire 122, contact arm 112, the proper contact 94, arm 100, wire 116; contact arm 102, the proper contact 108, arm 114 and then to wire 124. The effect of this is as if a single switch had been closed across the lines 120, 124 to indicate correspondency between the numeral wheels 38 and 46.

Reference is next made to FIG. 3 for a description of the mechanical portions of the switch-like means 80, 82 employed in controlling operation of the motors 48, 50. These means are preferably mounted in a light-tight housing or housings (not shown in FIG. 3) and comprise disks 126, 128 secured to the variator output shafts 28, 30 respectively. Each disk has a series of ten holes therethrough which are equiangularly spaced on a common radius from the axis of the disk. Light sources 130, 132 are provided beneath the disks 126, 128 respectively and arranged to shine through the holes therein. On the opposite side of disk 126, above light source 130 are mounted a pair of photosensitive resistors, 134, 136. These resistors are commercially available and function such that their resistance decreases as the intensity of the light shining thereon increases. Thus as each hole passes beneath the resistors 134, 136 there is a sharp drop in their resistances. It is preferable that the holes in the disk 126 be substantially larger than the light receiving surfaces of the resistors 134, 136 so that their resistance will be lower for a finite length of time for reasons which will later be discussed in greater detail. Each decrease and subsequent increase in resistance results in current flow being controlled in a manner at least roughly equivalent to the action of a switch as will also be discussed in greater detail hereinafter. Each hole in the disk 126 represents one cycle of operation of the control circuit. Resistors 134, 136 are angularly spaced ¼ the angular distance between adjacent holes so that the drop in current in the resistor 136 occurs 90° (in this cycle of operation) after the drop in current in resistor 134.

Photosensitive resistors 135, 140 are disposed above the disk 128 opposite light source 132. The operation of the resistors 138, 140 in producing a switch-like action and their relative spacing is the same as it is for the resistors 134, 136.

Figure 5:
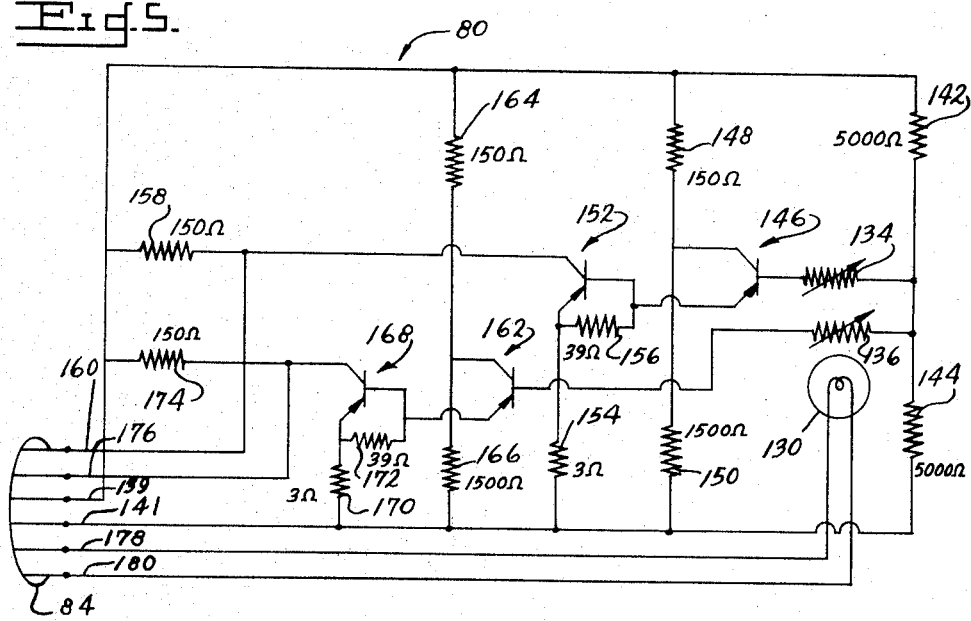
FIG. 5 is a diagrammatic showing of the electrical portions of one switch-like means.
Figure 6:
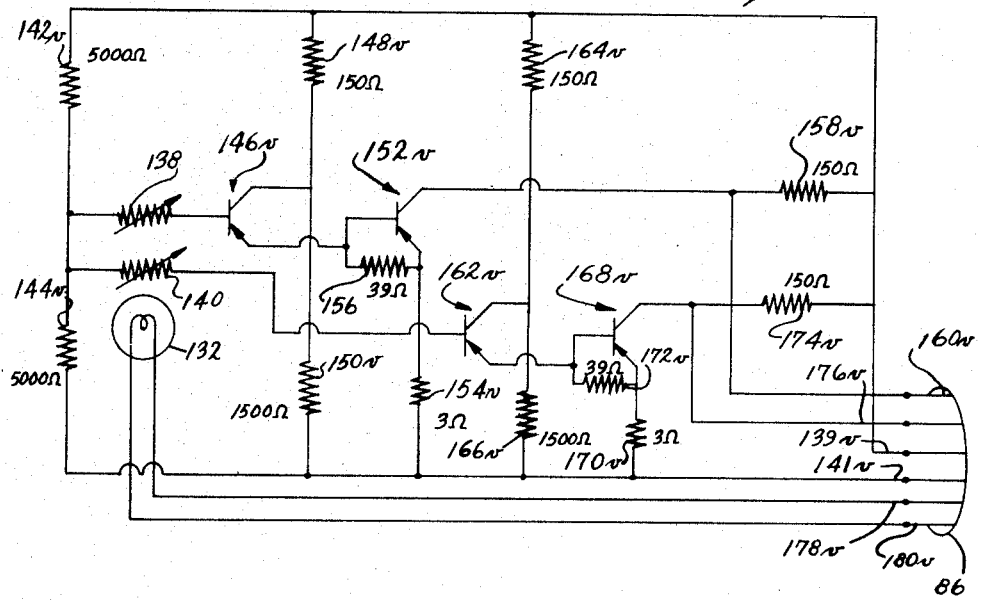
FIG. 6 is a digrammatic showing of the electrical portions of the other switch-like means.

Reference is next made to FIGS. 5 and 6 for a description of the electrical portions of the switch-like means 80, 82. As indicated above, the means 80 is responsive to rotation of the variator cost computing shaft 28, while the means 82 is responsive to rotation of the volume indicating shaft 30. The electrical portions of the means 80 and 82 are essentially identical and therefore in the following description reference will be made primarily to the means 80 seen in FIG. 5, but the same description will also apply to means 82 in FIG. 6 and like parts will be identified by like reference characters having a subscript $v$ except where separate reference characters have already been assigned.

The cable 84 (86) comprises wires or lines 139, 141 which are respectively connected to the negative and positive terminals of the direct current power supply previously referred to and have a potential of 80 volts therebetween. The cable 84 (86) also comprises wires 160 and 176 which are, in effect, alternately connected by these switch like means to the biased power supply lines 139, 141 to impose polarity reversals on these wires relative to the common wire or tap of the power supply. The wires 160, 176 are connected to windings of the motor 48 (50) and the effect of the polarity reversals is later described in detail.

The electrical values given herein and set forth by legends on the drawings are for the sake of illustration only and in no way are to be taken as limiting in nature. The lines 139, 141 are connected to opposite ends of a voltage divider comprising resistors 142, 144. One end of the photosensitive resistor 134 (138) is connected to this divider intermediate the resistors 142, 144 while its other end is connected to the base of a PNP type, power transistor 146. The collector of this transistor is connected to a second voltage divider intermediate resistors 148, 150 which are connected in series across the negative and positive lines 139, 141. The emitter of transistor 146 is connected to the base of a second transistor 152. The emitter of this transistor is connected to the positive line 141 through resistor 154, while resistor 156 connects the base and emitter thereof. The collector of transistor 152 is connected to the negative line 139 through resistor 158 and to wire 160.

Normally, when light is blocked from the photosensitive resistor 134 (138), it has a resistance of approximately 1 megohm and there is, for practical purposes, no current flow through the transistors 146, 152. The wire 160 is thus connected to the wire 139 and, therefore, assumes the negative potential of said line 139 relative to the common tap of the power supply, less whatever voltage drop there is across resistor 158. Starting with this condition, the resistance of resistor 134 (138) is reduced to about 3,000 ohms as the disk 126 (FIG. 3) rotates to bring one of the holes therein into alignment with said resistor. There is now a current flow through the collector circuit of the transistor 146. This current flow is amplified in the emitter circuit thereof causing current flow in the collector circuit of the second transistor 152. This second stage of amplified current flow causes the transistor 152 to function substantially as a conductor between lines 141 and 160 whereby wire 160, in effect, is connected to line 141 and assumes the positive potential of line 141 with respect to the common tap of the power supply less whatever small voltage drop there is across resistor 154 and transistor 152. Thus, when light strikes the photosensitive resistor 134 (138) it is essentially as if a switch had been closed across the lines 141 and 160. Conversely, when light is blocked from resistor 134 (138) it is as if this imaginary switch had been opened.

The function of photosensitive resistor 136 (140) is essentially the same in providing a switch-like connection between the positive line 141 and line 176. This resistor is also connected to the first voltage divider intermediate the resistors 142, 144 and then to the base of a transistor 162. The collector of this transistor is connected to a third voltage divider intermediate resistors 164, 166 which are connected in series across the lines 139, 141. The emitter of this transistor is connected to the base of another transistor 168. The emitter of transistor 168 is connected to the positive line 141 through resistor 170 and the base and emitter thereof are connected through resistor 172. The collector of transistor 168 is connected to the negative line 139 through a resistor 174 and also directly to the line 176.

When light strikes the photosensitive resistor 136 (140), its resistance is reduced so that current flows through transistor 162. The two stages of current amplification cause the transistor 168 to act substantially as a conductor so that line 176 is, in effect, directly connected to line 141 with a small voltage drop across transistor 168 and resistor 170. When light is blocked from resistor 136 (140), it's as if the switch-like connection between lines 176 and 141 were opened and the line 176 again connected to line 139 to impose polarity reversals thereon relative to the common tap of the power supply.

The transistors 146, 152, 162, and 168 are PNP, power type transistors, the selection of which for the desired current capacities would be obvious to those skilled in the art. The selection of the other components would likewise be obvious taking into account the described functions.

It is, of course, possible that a single stage of transistor amplification could be employed or that equivalent vacuum tube circuitry could be employed, although the described use of transistors is to be preferred.

The light source 130 (132) is connected to lines 178, 180 which extend through cable 84 (86) to a power source of approximately 4 volts A.C. which is later explained. The light source 130 (132) employs a bulb preferably rated for operation at 6 volts. By using a lower voltage it is possible to obtain an extremely long working life from the bulb.

Next, the components of the control box 58 will be described with reference to FIG. 7. Lines 192, 194 extend through cable 196 to a source of electrical current, say 110 volts A.C. A master control switch (not shown) may be provided at a remote location as in the main building of the service station. Lines 192, 194 are connected directly to the primary of a transformer 198. The main secondary winding of this transformer has four taps or leads 200, 202, 204 and 206, the first three of which are connected to a rectifier circuit of known design comprising silicon diodes 208 and capacitors 210. The direct current output of this rectifier circuit is connected to a positive line 212, a common line 214 and a negative line of 216. The potential of the lines or terminals 212, 216 relative to the common line 214 is 40 volts and the potential across lines 212 and 216 is 80 volts. The transformer tap 206 is connected to line 218 which provides alternating current at a potential of 125 volts relative to the common line 214. The other secondary of transformer 198 is connected to lines 220, 222 to provide an alternating current source of four volts for the light sources 130, 132. The lines 220, 222 are connected to the wires 178, 180 and 178v, 180v extending from these light sources, as shown.

Five relays control energization of various components of the dispensing unit 10 and the remote register 12. The first of these, R1, may be referred to as the main relay and has one side of its coil 224 connected to the common line 214. The other side of coil 224 is connected to the negative line 216 through start switch 66 (FIG. 1) and the unit price switch units 52, 54. These switch units function as a single switch, which is normally closed, and permit energization of coil 224 when the wheels 46 correspond to the wheels 38. Relay R1 is therefore normally energized when the operator closes start switch 66 at the dispensing unit. At this point it will be noted that there is a duplicate showing of the contacts operated by each relay. These contacts are shown in association with the relay to illustrate the number and normal condition of contacts operated by each relay and then are shown dissociated from the relay in the electrical circuits which they control to illustrate their function.

Continuing the description of the relays, one side of the coil 226 of relay R2 is connected directly to the common line 214. The other side of coil 226 is connected to the negative line 216 through parallel contacts R2–3 and R4–1 and through the "zero indicating" switch 86 at the remote register 12.

One side of the coil 228 of relay R3 is connected directly to the common line 214. The other side of coil 228 is connected to the negative line 216 through parallel contacts R3–3 and R4–2 and through the "zero indicating" switch 84 at the remote register 12.

One side of the coil 230 for relay R4 is also connected directly to the common line 214. The other side of this coil is then connected to the negative line 216 through a capacitor 232, switch 66 and switches 52, 54. A resistor 233 is connected in parallel across the capacitor 232.

One side of the coil 234 for relay R5 is connected to the main power line 194 through a germanium diode 236 providing direct current therefor and a resistor 238. A capacitor 240 is connected across the coil 234. The other side of coil 234 is connected to the other power line 192 through line 239 and relay contacts R3–1, R2–1 and R1–4.

The operation of the present system provides for zeroing of the register wheels at the dispenser 10 and remote register 12 immediately prior to the start of a delivery of gasoline. As previously described, the operating lever 60 (FIG. 1) is rotated to close the start switch 66. Closure of switch 64 actuates known means to zero the wheels 34, 36 and also actuates means, now to be described, for zeroing the wheels 42 and 44.

Closing of switch 66 results in a momentary energization of relay R4. Thus a pulse of current is passed by the capacitor 233 which is sufficient to insure a momentary closure of the contacts of relay R4. Resistor 233 discharges the capacitor 232 so that a pulse of current will again be passed thereby on the next subsequent closure of switch 66 and also so that the relay R4 will not be energized when the switch 66 is opened.

Contacts R4–1 close to energize relay R2 (reset indicating switch 86 is closed at this time). Contacts R4–2 close to energize relay R3 (reset indicating switch 84 is also closed at this time). Once the relays R2 and R3 are energized, they are maintained in this condition by hold-in contacts R2–3 and R3–3 as the relay R4 is deenergized shortly thereafter.

At this time relay R1 is also energized. Energization of relay R1 results in the immediate actuation of the pump motor 14 as relay contacts R1–1 are closed to complete a circuit from power lines 192, 194 to lines 243, 245 extending through cable 76. Gasoline is not actually pressurized for delivery from nozzle 22 at this time as the solenoid valve 18 remains deenergized and therefore closed. Thus it will be seen that the solenoid valve 18 is connected across power lines 192, 194 through a circuit, which includes relay contacts R1–4, R2–1 and R3–1, controlling flow of current through wires 247, 249 of cable 78. While contacts R1–4 are now closed, contacts R2–1 and R3–1 are open as relays R2 and R3 are energized until the remote register wheels are zeroed. Also, when relay R1 is energized, contacts R1–2 close to complete the circuit from lines 220, 222 to lines 178, 180 and 178v and 180v thereby energizing the light sources 130, 132 (FIGS. 5 and 6).

The immediate result of energizing relays R2 and R3 is that the stepping motors 48, 50 rotate in reverse directions to zero the remote register wheels while delivery of gasoline is prevented until the zeroing operation is completed.

At this point reference is made to FIG. 8 for a description of the simplified electric circuits of the motors 48. The two motors 48, 50 are identical so that a description of motor 48 will be given with applicable reference characters for like components of motor 50 shown in parentheses. The motor 48 comprises two field coils 242, 244 (246, 248) which are electrically 90° out of phase. The coils 242 (246) and 244 (248) have independent terminals 250 (252), 254 (256) respectively and are joined to a common terminal 258 (260). These coils are arranged to create a plurality of magnetic poles which coact with magnetic poles on the rotor. By reversing current flow in first one and then the other of these coils, an incremental rotation of the rotor is produced for each such reversal in accordance with the known principles of operation of stepping motors. In the present instance it is contemplated that each reversal of current will cause 1.8° revolution of the rotor of motor 48 (50).

As indicated above, "reverse" rotation of the motors 48, 50 occurs with relays R2 and R3 energized. The following description for motor 48 is equally applicable to motor 50 having reference to the corresponding components indicated by reference characters in parentheses. The basic principle of "reverse" rotation involves impressing an alternating current on the winding 244 (248). To this end the common terminal 258 (260) (FIG. 8) is connected by line 262 (264) through cable 70 (72) to the common line 214 (see also FIG. 7) of the power supply. The terminal 254 (256) is connected by line 266 (268), through cable 70 (72) and through the now closed contacts R3-2 (R2-2) to the alternating current line 218 of the power supply. At this time the terminal 250 (252) of motor 48 (50) is connected through line 270 (272) by way of cable 70 (72), to a capacitor 274 (276), resistor 278 (280) and then back to the first terminal 250 (252) through line 266 (268) as the contacts R3-4 (R2-4) are closed at this time.

A simplified showing of the connections to motor 48 under the conditions just described is found in FIG. 9. The following description is equally applicable to motor 50 having reference to the corresponding components previously described. The A.C. signal from the power supply is applied directly across the field coil 244. This A.C. signal is also passed by the capacitor 274 (276) and resistor 278 (280) whose values are selected to accurately give a 90° phase shift at this frequency. The A.C. signal is therefore also applied across the winding 242 but 90° out of phase with the signal across winding 244. This gives the desired reversal of current first in winding 244 and then in winding 242 which results in motor 48 rotating 1.8° in the desired "reverse direction" for each current reversal in each winding.

As described above, reverse rotation of the motors 48, 50 will cause the wheels 42, 44 to be zeroed by the means disclosed in said application Serial No. 807,509. When these wheels are zeroed, normally closed switches 84 and 86 will be opened, thereupon deenergizing relays R2 and R3. When this occurs contacts R3-2, R2-2 open to disconnect the A.C. signal fed to windings 244 (248) and contacts R3-4 (R2-4) open to break the connection between the independent terminals 250 (252) and 254 (256) of the two field windings. "Reverse" rotation of motors 48 and 50 therefore stops immediately.

With the sudden stopping of the stepping motors there is a tendency for the lowest order wheels 42 and 44 to rebound past a true zero position. This tendency is overcome by an electrical detent action of the motors 48 and 50. To this end a resistor 281 (FIGS. 7 and 10) connects the negative power supply line (across contacts R5-1) to the line 139 (see also FIGS. 8 and 6). This causes the motor winding 242 (246) to be connected across the negative portion of the power supply at all times. The resultant current flow produces a detent effect tending to to releasably maintain the rotor of motor 48 (50) in any one of a plurality of angularly spaced positions. The number of such positions is dependent on the electrical characteristics of the motor, in the present instance being 50. The amount of current flow for this detent action is approximately 10% of normal current flow and has no noticeable effect on reverse rotation of the motors.

The mechanical drive for the wheels 42, 44 is such that their positions are directly dependent on the angular position of the rotors of the stepping motors when moving in a forward position. The rebound of the wheels is in a forward position and causes the rotors of the stepping motors to be locked in the first detent position encountered on rebound. The wheels 42, 44 will thus be accurately locked in predetermined positions after each reverse rotation of the stepping motors which positions are preselected as their zero positions.

During the above discussion it has been assumed that only relay R1 is energized. This holds true for a short interval after deenergization of relays R2 and R3 because of the time delay circuit provided for energization of relay R5. Thus, it will be seen that contacts R2-1 and R3-1 (FIG. 7) close upon deenergization of relays R2 and R3 to complete the circuit through coil 234 of relay R5. The effect of resistor 238 and capacitor 240 is to cause the time delay, referred to, in energization of relay R5.

The provision of a time delay also prevents the wheels 42, 44 from being locked in a "minus" position. This could occur since energization of relay R5 results in the immediate application of a driving voltage across one or the other of the two coils of each stepping motor. When such voltage is applied, the rotors and the indicator wheels are immediately locked in fixed positions preparatory to being driven in a forward direction.

Deenergization of relays R2 and R3 also results in energization of the solenoid valve 18 through contacts R1-1, R2-1 and R3-1, so that the gasoline is now pressured to the nozzle 22 (see also FIG. 1) for delivery therefrom.

When relay contacts R5-1 close shortly thereafter circuits are completed from the negative power supply line 216 (FIG. 7) to the lines 139, 139v (FIGS. 5 and 6) at the switch-like means 80, 82. When relay contacts R5-2 close circuits are completed from the positive power supply line 212 (FIG. 7) to the lines 141, 141v (FIGS. 5 and 6), also at the switch-like means.

Lines 139, 141, 178 and 180 extend from control box 58 through cable 70 to the remote register 12 and then through cable 84 to the switch-like means 80. Similarly lines 139v, 141v, 178v and 180v extend from control box 58 through cable 72, to the remote register 12 and then through cable 86 to the switch-like means 82. This arrangement of these lines is simply a matter of convenience.

The switch-like means 80, 82 are now connected to the power supply with the lines 139, 139v and 141, 141v negatively and positively biased respectively as previously indicated. The output lines 160, 176 are connected respectively to the terminals 250, 254 of motor 48 and the output lines 160v, 176v are connected to the terminals 252, 256 of motor 50.

Reference is now made to FIG. 10 for a simplified showing of the effective circuit which is established when relay R5 is energized and relays R2 and R3 are deenergized after zeroing of the remote register wheels. Again only motor 48 is shown. Reference to the detailed description of FIGS. 6, 7 and 8 will make obvious the corresponding circuit and mode of operation for motor 50.

From this simplified circuit it will be seen that the positive and negative leads or terminals 212 and 216 of the power supply are connected to opposite ends of a resistance load, comprising resistor 158 and resistor 154. The transistor 152 acts as a switch, connected in series with the positively biased lead, which is opened and closed in response to variations in light intensity on the photosensitive resistor 134. Assuming for the moment that the transistor 152 is conductive and the effective switch provided thereby is closed, then current will flow through the resistance load comprising resistors 154 and 158. There will be a voltage drop across the resistor 154 of approximately 1½ volts. The point of connection between the motor terminal 250 and line 160 is such that there is positive potential or polarity on the terminal 250 of approximately 38.5 volts relative to the common terminal 214 which is connected to the other end of the coil 242. When light is blocked from the photosensitive resistor 134 the transistor 152 becomes at least substantially non-conductive as if the effective switch provided thereby were opened. When this occurs there is no longer any current flow through the positive line 141. When this occurs, current will flow from the negative line through resistor 158 and field winding 242 back to the common line 214. There will now be a negative polarity on the terminal 250 having a potential of approximately 16 volts (taking into account that there is a drop across resistor 158) relative to the common line 214. The reversal in polarity thereby produced at terminal 250 and thus across winding 242 will produce one increment of rotation of the motor 48.

The polarity at terminal 254 is also similarly reversed, thus it will be seen that resistors 174 and 170 provide a second resistance load which is also connected across the negatively and positively biased lines 216 and 212. Transistor 168 also effectively functions as a switch which is opened and closed in response to variations of light intensity on the photosensitive resistor 136. When the transistor 168 is conductive, there will be a positive potential on the terminal 254 of approximately 38½ volts relative to the common power supply line 214. When the transistor 168 is non-conductive and the effective switch provided thereby is opened, there will be a reversal of polarity and a negative potential of approximately 16 volts on the terminal 254 relative to the common power supply line 214.

These voltage conditions are illustratively depicted in FIG. 4, starting with a condition where light impinges on the photosensitive resistor 134 (as seen in FIG. 3) resulting in the transistor 152 being conductive. The voltage at terminal 250 is approximately 38½ volts. At this time light is blocked from the resistor 136 and the transistor 168 is non-conductive. The effective switch provided thereby is thus opened and the potential on terminal 254 is approximately a negative 16 volts relative to the common power supply line 214. This also is the condition of the circuit illustrated in FIG. 10.

As delivery of the gasoline continues, disk 126 will be rotated in the direction indicated in FIG. 3, causing light to shine on the resistor 136 so that the transistor 168 will become conductive and the potential on terminal 254 will become approximately a positive 38½ volts. Next, light will be blocked from the resistor 134 and causing the transistor 152 to become non-conductive and resulting in a change of polarity on the terminal 250 to approximately a negative 16 volts relative to the common line 214.

Further rotation of disk 126 will result in light being blocked from resistor 136 and then light will again shine on resistor 134. Responsive to this, the voltage on terminal 254 will become minus 16 volts and then the voltage on terminal 250 will become plus 38.5 volts, both potentials being relative to the common line 214.

Each current reversal across each coil, as indicated in FIG. 4, results in one increment of rotation of the motor 48. It is essential that the current reversals do not occur simultaneously which is the reason for the preferred spacing between the resistors 134 and 136 being one-fourth the distance between the holes in the disk 126. Also, the provision of holes in the disk 126 larger than the light receiving surfaces of the resistors 134 and 136, results in the polarity reversals being provided at a faster rate which is also highly desirable.

With the described arrangement the motor 48 faithfully follows the rotation of the variator shaft 28 in incremental steps and the remote price indicating wheels 42 will at all times show the same figures as the price indicating wheels 36 at the dispenser 10.

There is a possibility of current leakage through the transistor circuits when they are supposedly giving the effect of an open switch. This condition is illustrated by the phantom resistors connected across these switch-like means in FIG. 10. This also a variable which can be tolerated without necessarily affecting the desired end result of obtaining polarity reversals for operation of the motor. Thus it is sufficient that the current between the positive terminal of the power supply and the lines 160, 176 be reduced sufficiently to cause a polarity reversal across the windings 242, 244.

The operation of the stepping motor control circuit herein described and the variations thereof which follow are broadly characterized by the provision of a resistance load connected across biased terminals of a D.-C. power supply. One end of one of the field windings of the stepping motor is connected to the common terminal of the power supply, and the other end of this field winding is connected to the resistance load at a point which biases the other end of this field winding, with the polarity of one of said biased power supply terminals relative to the common terminal. Means are then provided for reducing current flow between the named power supply terminal and the point of connection made with the resistance load by the other end of this winding sufficiently for the other end of the winding to assume the polarity of the other biased power supply terminal relative to said common terminal. Means are then provided for alternating the polarity across the other field winding of the stepping motor out of phase with the reversal of the polarity across the described field coil and at the same rate. In the described embodiment, reversal of current across the field is accomplished by essentially the same means as are used to reverse the current across the first field coil.

In certain instances where high rates of operation are desired, difficulties have been encountered in obtaining polarity reversal at the desired rate. This shortcoming apparently results from the fact that as the disk 126 (FIG. 3) rotates at such a rapid rate that the photosensitive resistors are not able to attain their maximum and minimum values. This results in the transistors connected thereto not becoming fully conductive or non-conductive.

To obviate this problem, each of the photosensitive resistors previously described may be incorporated in a circuit corresponding to the one shown in FIG. 11 for the resistor 134. The resistor 134 is now connected as one arm of a resistance bridge comprising a relatively high resistor 302 and resistors 304, 305 and 306 which are relatively low values. Lines 308, 310 are connected to the negative and positive terminals respectively of a separate 6-volt, D.-C. power supply and are connected to the resistance bridge between the photosensitive resistor 134 and the resistor 304 and between the resistors 302 and 306 respectively. The base of the transistor 146 is connected to the resistance bridge between the photosensitive resistor 134 and the resistor 302, while the emitter of the transistor 146 is connected to the resistance bridge between the resistors 305 and 306 with resistors 311 interposed in the connection between transistor 146 and the resistance bridge. In this manner, the base of transistor 146 is positively biased to cut off so that a fairly sharp transition to an amplifying condition is reached with a minimum change in the value of resistor 134. It was found possible to operate at extremely high rates of operation by employing this resistance bridge.

It will be seen that the base of transistor 152 is also connected to the resistance bridge through resistor 311 and this transistor is thus biased to cut off by the positive line 141 being connected between resistors 304 and 305. Thus, both transistors are biased to cut off so that there will be no current leakage in the transistor circuit under any conditions.

Under certain circumstances, the use of photosensitive resistors and the required light source therefor may become impractical or undesirable. In such event, the switch-like means may take the form illustrated in FIGS. 12 and 13. Only the alternate switch-like means 80, used for controlling operation of the remote price indicating wheels 42, is shown. Essentially, the same arrangement could be employed for the remote volume indicating wheels 44, if desired. A disk 312 is secured to the price indicating shaft 28 of the variator and has affixed thereto a series of equiangularly spaced magnetic disks 314 of opposite polarity. A pair of induction coils 316, 318 are disposed above the disk 312 and are each provided with iron cores 320, 322 which have depending legs which are spaced apart a distance equal to the distance between an odd number of magnetic disks 314. The depending legs of these cores overlie, but are spaced from, disks 314 as the disk 312 rotates. The legs of the cores 322 and 320 are further arranged so that when the legs of one are directly over a pair of magnetic disks 314, the legs of the other core are intermediate adjacent disks 314. As the disk 312 rotates, a magnetic pulse will be induced first in the coil 316 and then in the coil 318. The induced pulses will thus be electrically 90° out of phase with each other.

Reverting now to FIG. 13, it will be seen that one end of the coil 316 is connected to the base of a transistor 324, while the other end of this coil is connected to the emitter thereof. A pair of oppositely connected germanium diodes are connected across the coil 316 to limit the load imposed on the transistor 324. The collector of transistor 324 is connected intermediate a voltage divider comprising resistors 328 and 330. This voltage divider is connected across the negatively biased line 139 and positively biased line 141, previously described. The emitter of transistor 324 is connected to the base of a second transistor 332. The emitter of the second transistor is connected to the positively biased line 141 through resistor 334. The base and collector of transistor 332 are connected by a resistor 336 and the collector in turn is connected to the terminal 250 for motor winding 242. A connection is also made between the negative line 139 and the terminal 250, through resistor 338. The coil 318 is included in a similar circuit, being connected to the base and emitter of transistor 340 with oppositely connected germanium diodes 342 being connected thereacross. The collector of transistor 340 is connected intermediate a voltage divider comprising resistors 344 and 346, which in turn are connected across the negative and positive lines 139 and 141. The emitter of transistor 340 is connected to the base of a second transistor 348, the emitter and base of which are interconnected by a resistor 350. The emitter of transistor 348 is connected to the positively biased line 141 through a resistor 352. The collector transistor 348 is connected to the independent terminal 252 of motor coil 244. The negative line 139 is connected to the terminal 252 through a resistor 354. The common terminal of the coils 242, 244 is connected to the common line 214 of the D.-C. power supply previously described.

With the described circuit, as the disk 314 rotates, positive and negative pulses of current are induced in the coils 316 and 318. Each time a positive pulse of current is induced in the coil 316, the transistor 324 is rendered conductive and an amplified current flows through the transistor 332. Likewise, each time a positive pulse of current is induced in the coil 318, current flows through the transistor 340 and an amplified current flows through the transistor 348. The positive pulses of current thus induced act as switches to cause current to flow through the transistor 332 and 348.

Again, it will be seen that a resistance load comprising resistors 338 and 334 is connected across the positively and negatively biased lines of a D.-C. power supply when the transistor 332 is conductive so that the terminal 250 assumes the positive potential of that power supply relative to the common line 214. When the transistor 332 is non-conductive, the terminal 250 assumes a negative potential relative to the common line 214, thereby reversing the polarity across the coil 242 in a manner similar to that previously described. Likewise, resistors 354 and 352 comprise a resistance load connected across the positive and negative terminals of the power supply when the transistor 348 is conductive so that the terminal 252 assumes the positive potential of the power supply. Terminal 252 assumes the negative potential of the power supply when the transistor 348 is non-conductive. The 90° phase relationship between the pulses induced in the coils 316 and 318 provide for the reversal of current in the motor coils 242, 244 to be out of phase with each other.

The means for controlling operation of the stepping motors have heretofore been referred to as a switch-like means. It is also possible that actual contact switches may be employed for these purposes as the means 80″ seen in FIGS. 14 and 15. A pair of contacts or switches 356, 358 are mounted on opposite sides of a disk 360 secured to a price indicating shaft 28 of the variator. Ten equispaced cams are formed on the peripheral face of the disk 360 and are arranged to close the contacts 356 and 358. These contacts are spaced relative to the disk 360 so that first one and then the other of the contacts will be closed and then opened.

The electrical arrangement will be seen in FIG. 15. A resistance load comprising a single resistor 362 is connected across the negative and positive lines 139, 141 which are connected to the power supply as previously described. The terminal 250 of motor coil 242 is connected to this voltage divider on the negative side thereof so that when the contacts 356 are closed, the terminal 350 assumes substantially the full negative potential of the power supply line 216 relative to the common line 214, which potential is imposed across the motor winding 242. When the contacts 356 are opened, a positive potential of lesser value (due to the drop across resistor 362) is imposed on the terminal 250, relative to the common line 214. Similarly, a resistance load comprising a single resistor 364 is connected across the negative and positive lines 139, 141 so that when the contacts 358 are closed, the terminal 252 assumes the positive potential of the power supply and when the contacts 358 are opened, the terminal 252 assumes the negative potential of the power supply (less the voltage drop across the resistor 364) relative to the common line 214. The spacing of the contacts 356, 358 relative to the disk 360 causes these contacts to open and close out of phase with each other so that the current reversals produced thereby will also be out of phase.

In FIG. 16 one further embodiment of the invention is illustrated showing a simpler switch means 80‴. A resistor 368 is connected across the positive and negatively biased lines 141 and 139 of the power supply and contacts 370 are intermittently opened and closed by rotation of the disk 360, previously described, to reverse the polarity of terminal 250 relative to the common line 244 and thereby produce the desired reversal of polarity across the field winding 242. However, in the present instance, reversal of current across the other field winding 244 is produced by the simple expedient of connecting a capacitor 372 between the terminals 250 and 252. Thus, the reversal of current produced on the terminal 250 will be transmitted to the terminal 252 with approximately a 90° phase relationship. This use of the capacitor 372 to provide the current reversal across coil 244 may be used with any of the switch-like means herein disclosed, if desired. It will be noted, however, that when reversing the polarity across coil 244 by using this capacitor that each time the contact 356 is opened there will be two increments of rotation of the motor 48 and likewise each time the switch 356 is closed, there will be two increments of rotation of the motor 48 so that the effective steps taken by the motor 48 will be somewhat coarser than where independent controls are provided for reversing the polarity across each of the field windings of the motor 48. Also, when separate controls are provided for each field winding the motor 48 will faithfully follow the shaft 28 in both a forward and reverse direction.

*Summary*

It is believed that the foregoing description fully describes the operation of the present invention. However, a brief summary will now be given. In normal operation, to begin a delivery of gasoline, the nozzle 22 is first removed from the hanger 60. The hanger is then rotated to close start switch 66. The price and volume indicating wheels 34 and 36 at the dispensing unit are automatically reset to zero in response to closure of switch 66 through the connection 67. Presuming the unit price of wheels 38 and 46 are in conformity, closure of switch 66 also (FIG. 7) causes energization of relay R4 which in turn causes energization of relays R2 and R3. With relays R2 and R3 closed, the motors 48 and 50 are rotated in reverse direction with the electrical circuit effectively as is shown in FIG. 9. That is, an alternating current is imposed upon one of the windings of each motor to reverse the polarity thereacross. This polarity reversal is also transmitted by condenser 274 and 276 to the terminals 250 and 252 to reverse the polarity across the other windings of each motor in a phased relationship. When the remote price indicating wheels 42 are zeroed, switch 84 opens, deenergizing relay R3. When the remote volume indicating wheels 44 are zeroed switch 86 is opened, deenergizing relay R2. Switch 66 now being closed, relay R1 is also energized. Upon subsequent deenergization of relays R2 and R3, relay R5 will be energized after a time delay sufficient for the remote price indicating wheels 42 and 44 to have returned to their exact zero positions. Upon energization of relay R5, connections are completed through contacts R5-1 and R5-2 to complete the circuit between the positive power supply line 212 and the positive line 141 (FIG. 10). The motors 48 and 50 are now prepared to rotate in a forward direction. Further, upon energization of relay R1, the pump motor has been energized so that gasoline is pressurized up to the dispensing unit 10. However, delivery cannot take place until after zeroing of the remote indicator wheels 42 and 44 and the subsequent deenergization of relays R2 and R3 to complete the circuit for energizing the solenoid valve 18. With both the motor 14 and solenoid valve 18 energized, gasoline is pressurized for delivery from the nozzle 22. As gasoline is delivered, the variator shafts 28 and 30 rotate operating the switch-like means 80 and 82. The switch-like means operate to reverse the polarity across the field windings of the motors 48 and 50 so that these motors rotate in conformity with the shafts 28 and 30, and the readings on the indicating wheels 42 and 44 correspond respectively to the readings on the wheels 34 and 36 at the dispensing unit.

It will be apparent from the preceding description how the various alternate switch-like means may be employed and it will also be apparent that these switch-like means controlling operation of the stepping motors may be used in other environments to similarly control stepping motors.

Having thus described this invention, what is claimed as novel and desired to be secured by Letters Patent of the United States is:

1. A liquid dispensing unit and remote register combination, said dispensing unit comprising a meter having a drive output rotatable proportionately with the amount of liquid delivered, a stepping motor for driving said remote register, and means for rotating the stepping motor in conformity with the drive output of said meter, said stepping motor comprising two 90° phased field windings, said rotating means comprising a D.-C. power supply having positively and negatively biased terminals and a common terminal, one end of one field winding being connected to said common terminal, a resistance load connected across said power supply, the other end of said field winding being connected to the resistance load to bias said other end with the polarity of said negative terminal relative to the common terminal, switch-like means comprising a transistor, the collector of which is connected to said resistance load and the emitter of which is connected to said positive terminal, whereby when the transistor is conductive the resistance load is connected across the power supply and the said other end of one field winding assumes a positive polarity, and when the transistor is non-conductive, said other end assumes a negative polarity, means for alternately rendering the transistor conductive and non-conductive, means for automatically imposing a positive cut-off potential across said transistor when the last-named means render it non-conductive and means for reversing the polarity across the other field winding out of phase with the reversal of polarity across said one winding.

2. A liquid dispensing unit and remote register combination, said dispensing unit comprising a meter having a drive output rotatable proportionately with the volume of liquid delivered, a stepping motor for driving said remote register and means for rotating said stepping motor in comformity with the drive output of said meter, said stepping motor having two 90° phased field windings, said rotating means including an induction coil and a magnet spaced therefrom and means connected to the drive output of said meter for rotating one relative to the other to generate pulses of current in the coil, and means responsive to the generation of pulses in the coil for reversing the polarity across one field winding and means for reversing the polarity across the other field winding out of phase with the reversal of polarity across one field winding.

3. A liquid dispensing unit and remote register combination as in claim 2 wherein the induction coil is elongated, an iron core is disposed within said coil, and wherein the magnet takes the form of a disk secured to the drive output of the meter and has disposed thereon a plurality of equiangularly spaced magnetic elements lying on a common radius, said magnetic elements having first one polarity and the other polarity, and further wherein the elongated core has copending legs lying on said common radius and closely spaced from said magnetic elements, said depending legs being spaced apart a distance equal to the distance between an odd number of magnetic elements.

4. A servomotor system comprising a rotatable member, a stepping motor and means for rotating the stepping motor in conformity with the rotation of said rotatable member, said stepping motor comprising two 90° phased field windings, said rotating means comprising a D.-C. power supply and positively and negatively biased terminals and a common terminal, one end of one field winding being connected to said common terminal, a resistance load connected across said power supply, the other end of said field winding being connected to the resistance load to bias said other end with the polarity of the positive terminal of the power supply relative to the common terminal, switch-like means comprising a transistor, the collector of which is connected to the resistance load and the emitter of which is connected to said positive terminal whereby when the transistor is conductive the resistance load is connected across the power supply, and the said other end of the one field winding assumes a positive polarity, and when the transistor is non-conductive, said other end assumes a negative polarity and means for alternately rendering said transistor conductive and non-conductive, said last-named means comprising a coil and magnet and means connected to said rotatable member for rotating one relative to the other to generate pulses of current in the coil and a connection between the base of said transistor and said coil for causing the transistor to become conductive in response to generation of positive pulses of current in the coil and means for reversing the polarity across the other field winding out of phase with the reversal of polarity across said one winding.

5. A servomotor system as in claim 4 wherein a pair of semi-conductors are connected across said coil so as to be conductive in opposite directions, and further wherein the connection between the coil and the transistor comprises a second transistor, the base of which is directly connected to the coil and the emitter of which is connected to the base of the first-named transistor thereby providing two stages of amplification for current generated in the coils so that the servomotor will conform to both low and high rates of rotation of the rotatable member with the semi-conductors preventing an undue current load on the transistors.

6. A liquid dispensing unit and a remote register combination, said dispensing unit comprising a meter having a drive output rotatable proportionately with the amount of liquid delivered, an electrical stepping motor for driving said remote register and means including a switch-like element for rotating the stepping motor in conformity with the drive output of said meter, said stepping motor comprising two 90° phased field windings, said rotating means comprising a D.-C. power supply having a common terminal and oppositely biased terminals, one end of one field winding being connected to said common terminal, a fixed resistance connected in series with said other end of said one field winding and one of said biased terminals and having a value impressing on said other end of said one field winding the polarity of said one biased terminal, said switch-like element being connected in series with said fixed resistance and the other biased terminal and also being connected in series with said other biased terminal and said other end of said one winding whereby when said switch-like element is closed the polarity of said other biased terminal will be impressed on said other end of said one winding to obtain a reversal of polarity across said one winding, means apart from the circuit set forth for alternately opening and closing said switch-like element in response to rotation of said drive output, means for reversing the polarity across the other field winding 90° lagging the reversal of polarity across said one winding, means for selectively rotating the stepping motor in reverse direction, said reverse rotating means comprising means for imposing an alternating current on the other of said field windings to reverse the polarity thereacross, one end of said other field winding being connected to said one end of said one field winding and a condenser connected between said other ends of each of said field windings to reverse the polarity across said one field winding correctly out of phase with the polarity reversal across said other field winding due to the alternating current impressed thereacross and means operative in response to reverse rotation of said stepping motor for zeroing of said remote register.

7. A liquid dispensing unit and a remote register combination, said dispensing unit comprising a meter having a drive output rotatable proportionately with the amount of liquid delivered, an electrical stepping motor for driving said remote register and means including a switch-like element for rotating the stepping motor in conformity with the drive output of said meter, said stepping motor comprising two 90° phased field windings, said rotating means comprising a D.-C. power supply having a common terminal and oppositely biased terminals, one end of one field winding being connected to said common terminal, a fixed resistance connected in series with said other end of said one field winding and one of said biased terminals and having a value impressing on said other end of said one field winding the polarity of said one biased terminal, said switch-like element being connected in series with said fixed resistance and the other biased terminal and also being connected in series with said other biased terminal and said other end of said one winding whereby when said switch-like element is closed the polarity of said other biased terminal will be impressed on said other end of said one winding to obtain a reversal of polarity across said one winding, means apart from the circuit set forth for alternately opening and closing said switch-like element in response to rotation of said drive output, means for reversing the polarity across the other field winding 90° lagging the reversal of polarity across said one winding, means for selectively rotating the stepping motor in reverse direction, said reverse rotating means comprising means for imposing an alternating current on the other of said field windings to reverse the polarity thereacross, one end of said other field winding being connected to said one end of said one field winding and a condenser connected between said other ends of each of said field windings to reverse the polarity across said one field winding correctly out of phase with the polarity reversal across said other field winding due to the alternating current impressed thereacross and means operative in response to reverse rotation of said stepping motor for zeroing of said remote register, and electrical means for temporarily arresting rotation of the stepping motor in a position corresponding to the zero reading of said remote register to thereby prevent rebound of said register to some other position.

8. A liquid dispensing unit and remote register combination as in claim 7, wherein the means for zeroing the remote register displaces the remote register to a minus position, means responsive to the remote register reaching said minus position, means responsive to the remote register reaching said minus position to deenergize said reverse rotating means, and further wherein means are provided for preventing actuation of the means for rotating the stepping motor in a forward direction for a predetermined time after the remote register is brought to its minus position.

9. A liquid dispensing unit and remote register combination as in claim 7 wherein a start switch is provided for actuation of said dispensing unit and further wherein the reverse rotating means brings the remote register to a minus position, and further comprises first relay means which are actuated when said start switch is actuated and which initiate operation of said reverse rotating means and means operative in response to the remote register reaching said minus position for deenergizing said first relay means and actuating the means for rotating the motor in a forward direction and the electrical detent means on said stepping motor are actuated in response to deenergization of the first relay means to halt the rotation of said stepping motor in a preselected position, and further wherein the means for operating the stepping motor in the forward direction comprise second relay means energized in response to deenergization of said reversing relay means, and wherein a time delay circuit is included in the means for energizing said second relay means whereby the means for actuating the stepping motor for operation in a forward direction will not be effective until a fixed time after the first relay means are deenergized so that the remote register will be accurately arrested in its exact zero position.

10. A liquid dispensing unit and remote register combination as in claim 9 wherein the arresting means comprise means for leaking a small amount of current from the other biased terminal through one of the field coils of the motor in an amount sufficient to cause an electrical detent action by the stepping motor but insufficient to effect reverse rotation thereof.

11. A servomotor system comprising a rotatable member, a stepping motor and means for rotating the stepping motor in conformity with rotation of said rotatable member, said stepping motor comprising two 90° phased field windings, said rotating means comprising a D.-C. power supply having biased terminals and a common terminal, one end of one field winding being connected to said common terminal, a resistance load connected across said power supply, the other end of said one field winding being connected to the resistance load to bias said other end with the polarity of the biased terminal of the power supply, switch-like means interposed between the connection of said other end of the one field winding to the resistance load and said one biased terminal, means operative in response to rotation of said rotatable member for opening and closing said switch-like means to reverse the polarity across said one winding and means for reversing the polarity across the other field winding out of phase with the reversal of polarity across said one winding, said switch means further including a set of contacts movable between open and closed positions and the means for opening and closing the switch-like means comprising a cam secured to said rotatable member and disposed to alternately open and close the contacts as the cam is rotated by said rotatable member.

12. Liquid dispending unit and remote register system comprising a meter having an output rotatably driven in response to the quantity of liquid dispensed by said unit, an electrical stepping motor for driving said remote register, including 90° phased field windings, a source of potential having points of opposite polarity, means connecting one of said points of opposite polarity to one end of each of said field windings, means connecting the other end of said field windings to said potential source at a common point intermediate said points of opposite polarity, means including at least one transistor for each of said field windings, having base, collector and emitter electrodes, means connecting said collector-emitter electrodes from the other of said points of opposite polarity to said one end of each said field windings, means sequentially responsive to rotation of said meter for applying current to the base of each transistor to switch said transistor to low impedance mode, whereby the potential connected to each of said field windings is switched from one to the other of said points of opposite polarity in response to meter operation.

13. Liquid dispensing unit and remote register system as set forth in claim 12 including impedance connected across one of said points of opposite polarity and each of said field windings.

References Cited by the Examiner
UNITED STATES PATENTS

| | | | |
|---|---|---|---|
| 2,319,444 | 5/1943 | Crosby | 222—26 |
| 2,379,785 | 7/1945 | Bugg | 222—26 X |
| 2,402,928 | 6/1946 | Summers | 318—27 |
| 2,510,093 | 6/1950 | Ferguson et al. | 222—26 X |
| 2,540,617 | 2/1951 | Hazard et al. | 222—32 X |
| 3,027,048 | 3/1962 | Rapisarda | 222—35 |
| 3,077,555 | 2/1963 | Fredrickson | 318—341 X |

LOUIS J. DEMBO, *Primary Examiner.*